United States Patent
Grabmayr

(10) Patent No.: US 6,325,630 B1
(45) Date of Patent: Dec. 4, 2001

(54) FOREIGN LANGUAGE LEARNING DEVICE AND METHOD

(76) Inventor: Josef Grabmayr, Baumerstr. 19, 83071 Schlossberg (DE)

( * ) Notice: Subject to any disclaimer, the term of this patent is extended or adjusted under 35 U.S.C. 154(b) by 0 days.

(21) Appl. No.: 09/329,165

(22) Filed: Jun. 9, 1999

(51) Int. Cl.[7] .................................................. G09B 19/06
(52) U.S. Cl. ............................................................ 434/157
(58) Field of Search .................................... 434/157, 156, 434/178, 173; 40/638, 6, 641, 661; 283/81

(56) References Cited

U.S. PATENT DOCUMENTS

| | | | |
|---|---|---|---|
| 3,640,008 | * | 2/1972 | Crail ........................................ 40/2 R |
| 4,043,858 | * | 8/1977 | Dantowitz ............................. 156/251 |
| 4,187,628 | * | 2/1980 | Thompson ............................ 40/10 D |
| 4,215,497 | * | 8/1980 | Levy ...................................... 40/10 R |
| 4,531,312 | * | 7/1985 | Stoddart ............................... 40/10 D |
| 4,802,855 | | 2/1989 | Wood . |
| 4,863,384 | * | 9/1989 | Slade ..................................... 434/107 |
| 5,056,824 | * | 10/1991 | Olson .................................... 283/36 |
| 5,084,143 | * | 1/1992 | Smith .................................... 283/81 |
| 5,182,152 | * | 1/1993 | Ericson ................................. 428/42 |
| 5,283,091 | * | 2/1994 | Darvell ................................. 428/40 |
| 5,332,265 | * | 7/1994 | Groess .................................. 283/56 |
| 5,437,477 | * | 8/1995 | Olivera ................................. 283/81 |
| 5,484,168 | * | 1/1996 | Chigot .................................. 286/67 |
| 5,683,003 | * | 11/1997 | Gebka ................................... 211/57.1 |
| 5,967,561 | * | 10/1999 | Glenn ................................... 283/81 |
| 6,013,154 | * | 1/2000 | Cote ..................................... 156/277 |

FOREIGN PATENT DOCUMENTS

| | | |
|---|---|---|
| 845 441 | 8/1949 | (DE) . |
| 4403948 A1 | 9/1994 | (DE) . |

OTHER PUBLICATIONS

Kershul, Kristine, "German in 10 minutes a day", Bilingual Books, May 1998.*
Kershul, Kristine, "German in 10 minutes a day", Bilingual Books, Inc., May, 1998.

* cited by examiner

*Primary Examiner*—John A. Ricci
*Assistant Examiner*—K Fernstrom
(74) *Attorney, Agent, or Firm*—Renner, Otto, Boisselle & Sklar, LLP

(57) ABSTRACT

An improved foreign language learning device, particularly in a form similar to a vocabulary book or note-book, giving the foreign language terms to be learned, is characterized by the following: it is intended for use a reproduction or depiction holder having several labels and/or information carriers or holders, wherein the labels and/or the information carriers or holders are at least provided with an adhesive or holder section, and wherein the labels and/or information or label holders or carriers have individual foreign-language terms or groups of terms, sentences or sentence parts written on them.

29 Claims, 6 Drawing Sheets

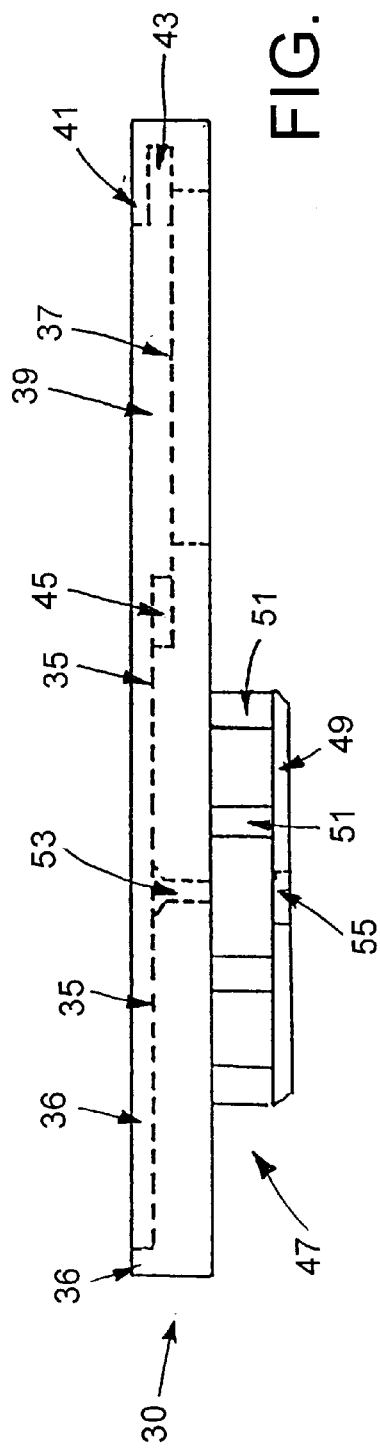
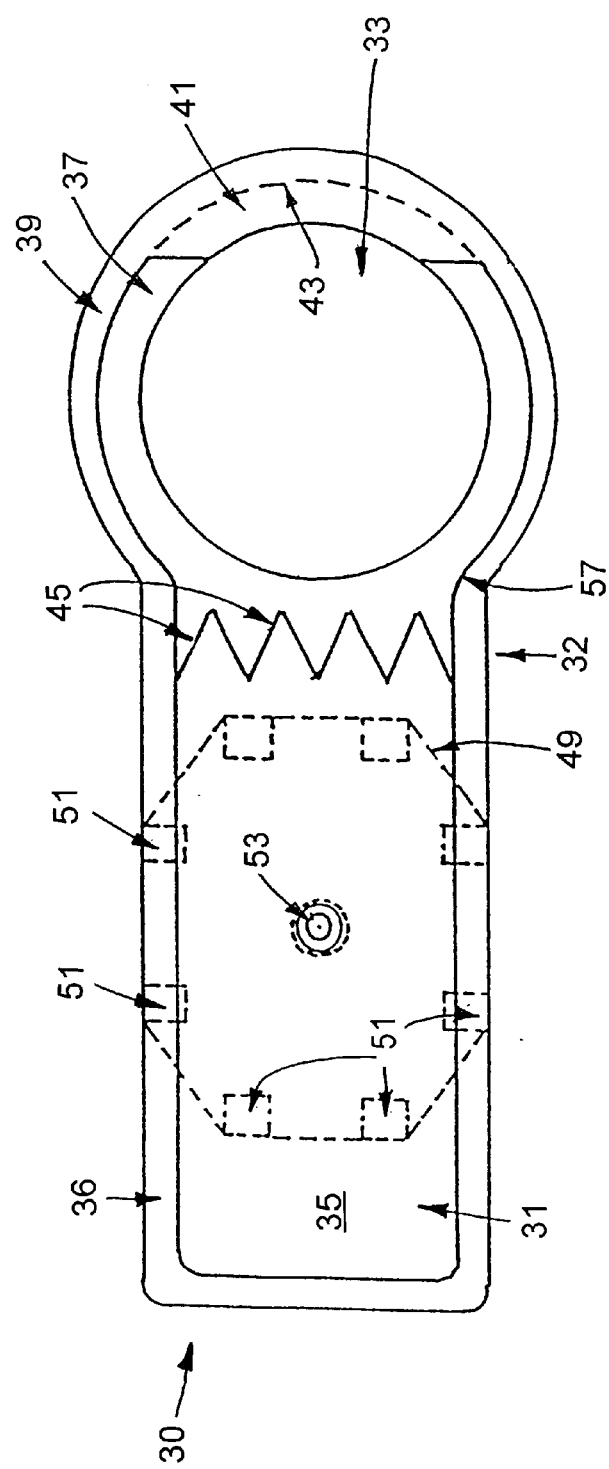

FOREIGN LANGUAGE LEARNING DEVICE AND METHOD

BACKGROUND OF THE INVENTION

The invention relates to learning a foreign language and method, and, more particularly, to a foreign language learning device and method.

It has been customary, for language learning purposes, to use special notebooks for learning words/vocabulary, in which, for instance, the left column contains the foreign words to be learned, while the right column contains the corresponding words or translations in one's mother tongue.

Although, in modern times, other mediums, such as cassettes, CDs or even audio-visual media are increasingly used for languages learning purposes, the traditional way of learning as described above is still of major importance.

An aspect of the present invention is to create an improved foreign language learning device which is available to everybody, and which allows and facilitates learning a foreign language in everyday life.

Visualizations are very common in people's talks and thoughts. They enrich and facilitate many thought-processes. The visual sense, however, is only one area of the brain which can facilitate and support, for example, mnemonic processes involved in language learning. However, nowadays, the brain area "responsible" for visual perception is mostly working at full capacity, due to overstimulation. At the same time, a great variety of things and characteristics, e.g. the fragrance of a flower, the softness of fur, etc. can usually be much better perceived with other senses. Also mnemonic processes can be assisted very nicely by other areas of the brain which are less frequently used. The fact, that in addition to visual perception, other forms of perception, such as, for example, smell, sound, taste, warmth, pressure, etc. give additional impetus and complexity to our thought-processes is also confirmed by modern psychology.

BRIEF SUMMARY OF THE INVENTION

Based on this background, according to an aspect of the invention, a foreign language learning device in accordance with the invention provides a learning device for learning foreign languages in everyday life. In accordance with the invention, it is intended for individual terms (adjectives, nouns, verbs, etc. incl. whole groups of words or sentences) to be written on individual labels, which, corresponding to their meaning, are attached to the corresponding object. If, for example, the German word "Stuhl" for the English word "chair" is to be learned, the label with the word "Stuhl" printed on it can be removed and attached to a chair in one's home. In this case, the chair is consciously touched and felt for its characteristics (surface, temperature, weight, movement, etc.).

Every time the user sees the label/object, he will be motivated to recall the corresponding word.

The learning device in accordance with the invention allows the creation of a learning environment which, to a certain extent, can be compared to the learning conditions prevailing in the country where the corresponding language is spoken.

Other terms can be attached to other object, corresponding to the term.

For certain topics, also posters (pictures) can be provided on which the terms can be attached to the individual items represented on the poster.

Once somebody finds out that he/she remembers the word, the label can be removed again.

The foreign language learning device in accordance with the invention comprises preferably a vocabulary book or glossary in a similar form, which contains individual labels with the individual foreign language terms printed on them. The labels are either available individually, or can be removed from a common label sheet.

It is also possible that several individual labels are printed on a joint sheet to be cut out or torn out by means of prepared perforations.

It is however, preferred intention to provide the individual labels as self-adhesive labels which may be attached to a label carrier, e.g. oil paper. It is particularly advantageous to provide these labels with a holding area which does not stick to the label carrier paper, as the holding area, for example, is not provided with any sticking material or adhesive film at all, or because the adhesive film is covered up additionally.

In a particularly favoured form, the paper or sheets with the mother-tongue terms written or printed on them, are bound in the form of a notebook or book, while, between two paper sections containing the mother-tongue terms, the label carrier paper of reduced width or section is inserted, on which the removable, self-adhesive labels containing the foreign language terms to be learned are arranged.

After learning individual terms, the labels removed from the corresponding objects can be returned again to the notebook-like foreign language learning device. In order to allocate the labels to the corresponding locations, every label can contain the pertaining explanations or, for instance, the corresponding word in German or a number, etc., which serves as orientation as to what location in the notebook or book-like device the label can be returned. In this book-like device, however, notes can also be made as to where the corresponding label is located.

The labels do not necessarily have to be self-adhesive. Also non-adhesive labels can be used, which, for example, may have to be cut out or removed along a perforation or cutting line. They can be attached to the object by means of other suitable means, such as, for example, drawing pins, rubber bands, string, etc.

According to the invention, it is intended to use also additional information or label holders, to which the labels—when they are provided with an adhesive film—can be affixed or on which the labels, for instance, can also be attached in a different way, for instance by putting them into a slot fixture. These label or information holders, in turn, can be provided with an adhesive film on the back or with other suitable means, in order to attach to and detach these label holders from certain objects by means of string, wire, drawing pins, magnets, etc.

According to another aspect a label has an adhesive zone, a holding zone, and a reinforcement of the holding zone.

According to another aspect a kit includes a plurality of labels and an instruction manual for teaching a language.

According to another aspect the invention includes computer program software and method for preparing labels to facilitate learning a language.

According to another aspect the invention relates to a computer system for developing labels for learning or teaching a language.

According to another aspect the invention relates to a method of learning a language including applying to objects labels containing words related to such objects.

According to another aspect the invention relates to labels and use thereof for learning or teaching a language.

Another aspect relates to use of multiple senses to facilitate learning or teaching vocabulary concepts in a language.

Another aspect relates to coordinating multiple activities in association with the learning of a language to make the process more active than only passive memorization.

Another aspect relates to a method of using labels for learning words and concepts in a language.

The invention comprises the features described herein, including the description, the annexed drawings, and, if appended, the claims, which set forth in detail certain illustrative embodiments. These embodiments are indicative, however, of but a few of the various ways in which the principles of the invention may be employed.

Although the invention is shown and described with respect to illustrative embodiments, it is evident that equivalents and modifications will occur to others skilled in the art upon the reading and understanding hereof. The present invention includes all such equivalents and modifications.

It will be appreciated that although several embodiments are illustrated and described, features shown in one embodiment may be used in one or more of the other embodiments of the invention.

BRIEF DESCRIPTION OF THE DRAWINGS

Hereinafter, the invention is explained in detail with examples by referring to the attached drawings. Here, the following details are explained:

FIG. 8 is a top view of a label or information holder or carrier;

FIG. 9 is a side view of the information or label holder or carrier according to FIG. 8;

DETAILED DESCRIPTION OF THE INVENTION

Figure 1:
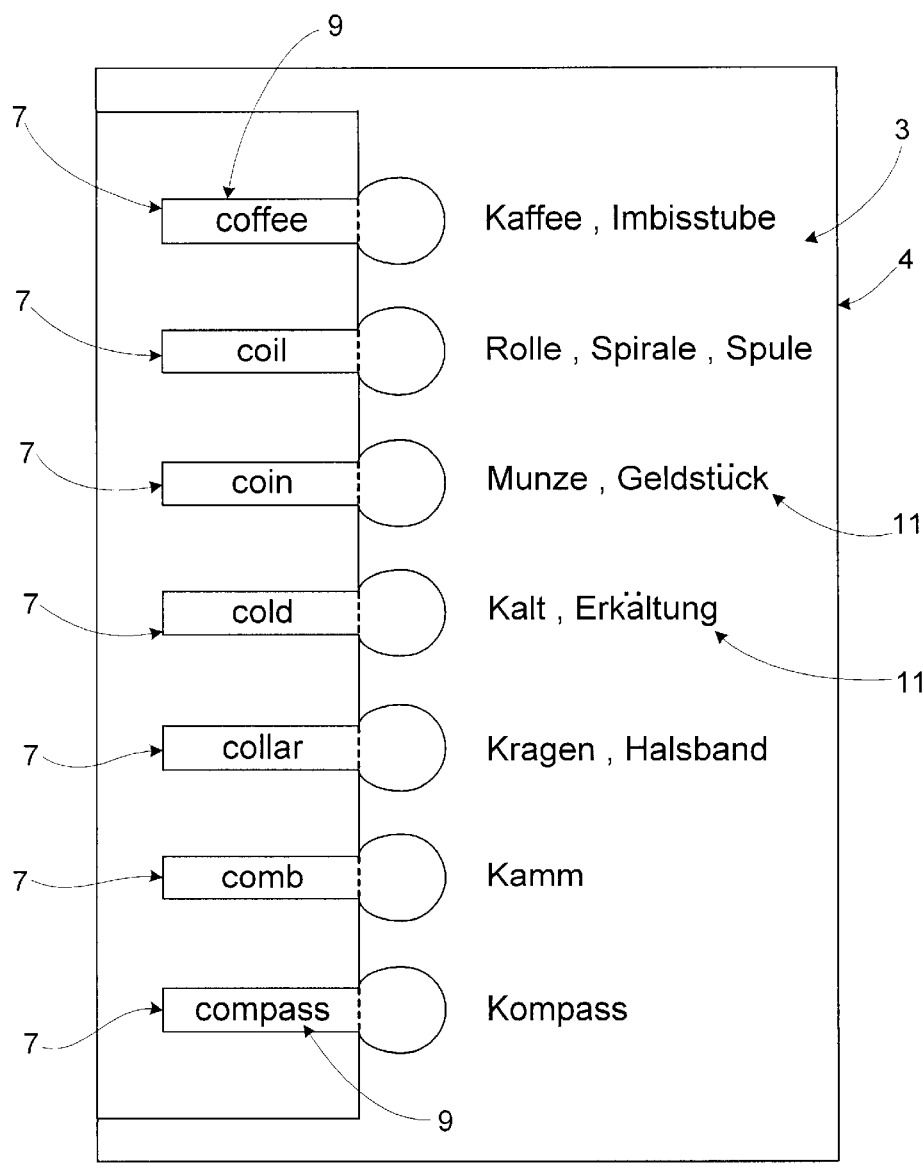
FIG. 1 is a schematic view of one page of the foreign language learning device according to the invention.

In FIG. 1, the whole page no. 1 of a vocabulary-book or notebook-like foreign language learning device is depicted. This whole page 1 comprises a sheet of paper printed with mother-tongue terms, hereinafter called P-sheet 3, which, in the example, are German terms.

On the left side of the whole page 1 as depicted in FIG. 1, a label carrier section 5, subsequently called E-sheet 5, is provided, which is much narrower and which extends over roughly the same height as the P-sheet 3. So, every whole page 1 mentioned comprises two sheets forming a pair, i.e. one E-sheet 5 and one P-sheet 3 underneath.

The label sheets 5 contain several rows (lines) of individual labels 7, i.e. self-adhesive or adhesive labels 7—separate from each other in this example—arranged one below the other, which have the foreign language terms to be learned 9 printed on them.

In the same row, however not on label carrier sheet 5, but on P-sheet 3 to the right, the mother-tongue terms, i.e. German terms 11 in our example, are printed, which correspond to the foreign language terms 9. In this way, the layout can be compared to traditional vocabulary books.

Figure 2:
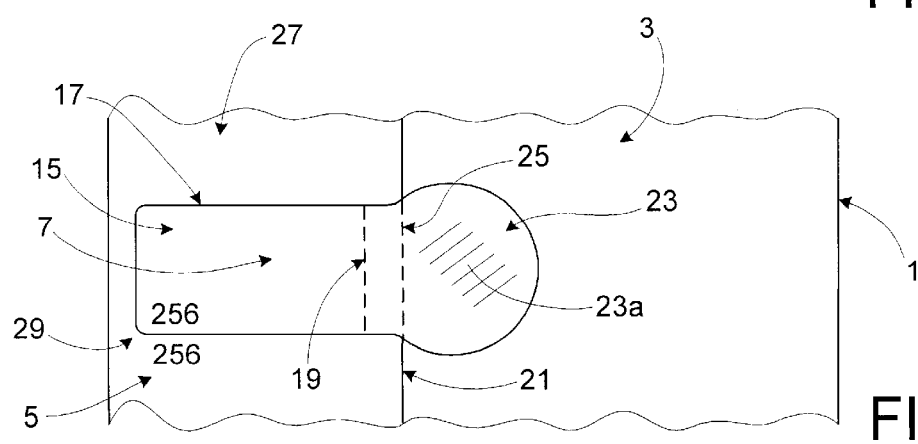
FIG. 2 is an enlarged detail drawing of one individual label as located on the inserted label carrier sheet, as displayed under FIG. 1.

As can be seen from the enlarged detail drawing according to FIG. 2, every label 7 preferably consists of two sections, one of which, in the example shown, is a more or less rectangular text zone 15, while the back of text zone 15 may be an adhesive zone 17, by means of which label 7 is affixed to label carrier sheet 5. Adhesive zone 17, as displayed in FIG. 2, may extend only as far as the broken line 19, i.e. it may end before the right margin 21 of label carrier sheet 5.

In the example shown, text zone 15 is followed by a circular holding area 23, which in the example shown is set-off optically, e.g., by being printed in red or some other color or by otherwise being clearly identified to stand out, as is schematically represented by shading 23a. Printing limit 25 of holding and signal area 23, printed in red, in this example, roughly corresponds to the location of the right margin 21 of E-sheet 5.

Preferably, holding area 23 is not provided with an adhesive film on the back, so that it cannot stick to P-sheet 3 underneath. Particularly, when the broken line 19, from the right margin, is displaced to the left can it be guaranteed that the label is always completely affixed to E-sheet 5, even if it is not positioned very exactly, and that no adhesive film on the label comes to rest to the right of the right margin 21 of E-sheet 5 and, therefore, cannot stick to P-sheet 3 underneath. By restricting the adhesive 17 to the area to the left of the line 19 as shown in FIG. 2, for example, helps to avoid getting adhesive on the fingers of a user while gripping the holding area 23 and/or getting dirt on the adhesive so the dirt would not be transferred to the object, e.g., avoiding smudges applied to a wall or an object.

Finally, the label may contain, as a rule in smaller print, either on the front, or if necessary also on the back, the German term or, for instance, an identification number, which allows the removed label to be returned to the original location at the zone or row 27 on the corresponding page provided for this term. An example of such numbering is shown at 29 where the number "256" is shown for such location correspondence.

Hereinafter, the function will briefly be explained.

In order to learn a term, the required label each is removed from the foreign language learning device, by taking the required label at the holding area 23, removing it from label carrier sheet 5 and affixing it to the corresponding object, e.g. in one's home. These terms are encountered day after day and can, thereby, be memorized without any problems by seeing them again and again. Due to the optically emphasized holding area 23 the labels attract the attention even more.

Once you are sure to have memorized the term, the corresponding label can be removed from the object in one's home and returned to the original location in the foreign language learning device. The original location can easily be found, as the foreign language label, for example, (which is not shown in detail in the illustrations), next to the term "coffee" may contain, in small print and at a suitable position, the terms "Kaffee"—"Imbiss-Stube", i.e. either on the front or on the back (before the adhesive film is applied to the label), or by giving a number in small print as at 29 (e.g. "256"), with the same number being printed on the page below the German term or at a corresponding position on label carrier sheet 5. It is, however, also possible, that the corresponding word is printed below or next to the location where the label is affixed, i.e. on the P-sheet.

Under certain circumstances, particular themes, e.g. cars, travelling, may be displayed on posters, showing the individual objects or processes, so that the labels can be allocated and attached to them on the posters.

In order to facilitate affixing of labels and to increase the scope of applications, also label or information holders can be used in addition to the labels on their own, which are hereinafter also called label or information holders.

Figure 3:
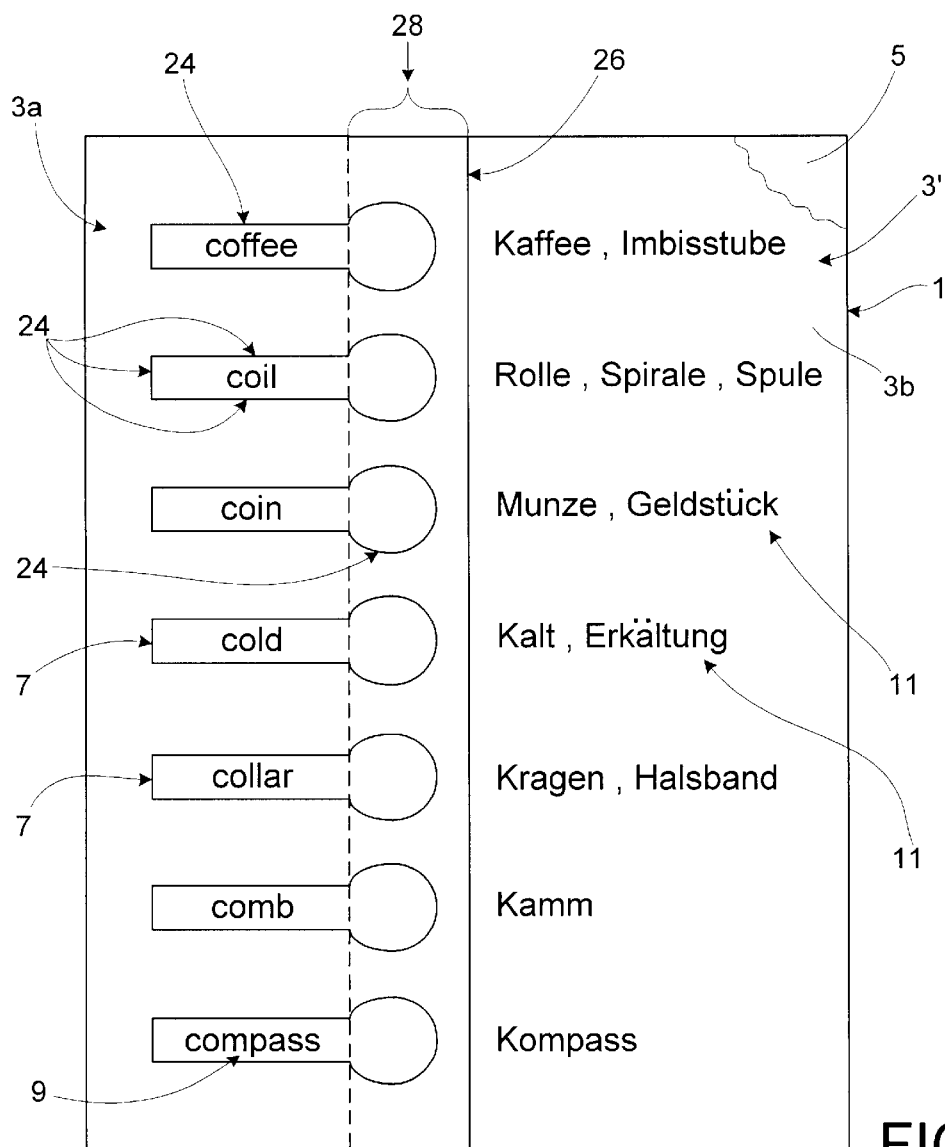
FIG. 3 is a modified application as compared to FIGS. 1 and 2 in form of a schematic top view.

In FIG. 3, an invention variant of FIGS. 1 and 2 is displayed, on which the labels containing the foreign language terms (or the empty labels with the terms written on them) and the corresponding word in the mother tongue are located on the same self-adhesive sheet, with the labels being pre-cut or stamped out, which can, therefore, be removed without any problems.

In the example according to FIG. 3, there is only one label carrier sheet 5, a so-called E-sheet 5, on which a self-adhesive sheet 3' or a self-adhesive paper foil 3' are affixed more or less all-over.

This self-adhesive paper foil 3', on the right side (right column), and similar to the example according to FIG. 1, contains several rows of the corresponding mother-tongue terms 11 (in the example German terms) one below the other.

On the left side, the actual labels 7 are pre-cut or stamped out via a stamping line or cutting line (or perforation line) 24.

If required, the corresponding individual label 7 can now be removed from label carrier sheet 5 along cutting line 24, and, if necessary, be returned to this location, as has been explained in the example according to FIG. 1 and 2.

In order to facilitate removing from and returning of labels 7 to the original location on label carrier sheet 5, section 3a of the self-adhesive paper foil 3' is removed from label carrier sheet 5 around labels 7. In order to separate it from the section containing the mother-tongue terms 11, the removable section 3a of the self-adhesive paper 3' is separated from the right-hand side in FIG. 3 by means of a cutting line or stamping line 26, so that the foreign language terms on the left can be separated from the mother-tongue terms on the right (without the label carrier sheet 5 being divided, too). Thus, section 3a on the self-adhesive paper foil 3' to the left of cutting or stamping line 26 can be removed, whereas labels 7, separated by stamping and cutting lines 24, remain affixed to the actual label carrier sheet 5.

In order to facilitate removing the labels from label carrier sheet 5 and to take advantage of the holding area as described under FIGS. 1 and 2, in our example according to FIG. 3, section 28, the area where the holding areas 23 are to be located, is either non-adhesive or the back of holding area 23 is provided with an additional intermediate cover in order to render the self-adhesive film ineffective.

In this example, every page 1, therefore, only consists of two layers, i.e. the carrier sheet 5 called label carrier sheet 5, also called E-sheet 5, on which the self-adhesive paper foil 3' with the removable section 3a on the left, the labels 7 located in the section with stamping and cutting lines, and section 3b located to the right of stamping or cutting line 26, which is to remain permanently on E-sheet 5 and which contains the mother-tongue terms 11. There may be an additional paper strip or a foil in zone 28 in order to render ineffective the adhesive film at the holding area on the back of labels 7.

Figure 4:
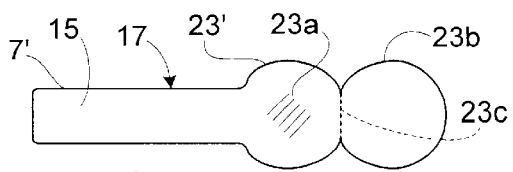
FIG. 4 is a plan view of another modified label made without special processing of the label stock.
Figure 5:
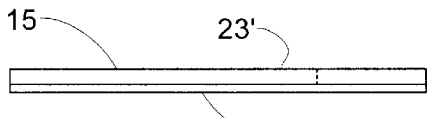
FIG. 5 is a side view of the label of FIG. 4.
Figure 6:
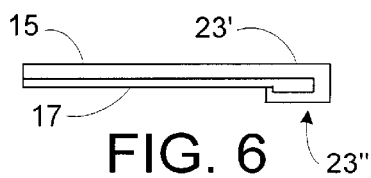
FIG. 6 is a side view of the label of FIGS. 4 and 5 showing a folded over section of the touching zone.

Referring to FIGS. 4–6, a modified label 7' is illustrated. The label 7' may be made or cut from conventional label stock material, such as that used to make decals or labels, having a base sheet sometimes referred to as a liner, and a face sheet, sometimes referred to as label material which has adhesive thereon. The face sheet can be die cut in the form of the desired label and can be removed from the liner for attachment to an object. The adhesive remains on the face sheet. If desired the adhesive for this and other embodiments hereof, can be of a type used with reusable labels, such as that employed in conventional Post-It™ type or other type notes/labels. An advantage of the label 7' is that there is no need to make a special label stock material to obtain a touching zone 23' (or manual holding zone) without adhesive. Rather, the label 7' can be removed from the liner and an extension 23b of the label can be folded along a fold line 23c as to be under the touching zone 23'. Therefore, the adhesive 17 on the surface of the label 7' in the areas of the touching zone 23' and the extension 23b will come into engagement and be sandwiched between the touching zone 23' and the extension 23b. Accordingly, the touching zone 23' and the extension 23b will be exposed to manual touching or grasping but will not have any exposed adhesive. This makes manual manipulation of the label 7' easy without having to remove adhesive from the fingers when applying the label to an object. Also, the folded over extension 23b, as is illustrated in FIG. 6 tends to reinforce the touching zone 23' and to provide added bulk or substance of the label 7', thus tending to make it easier to grasp, handle and manipulate than if the touching zone were less reinforced, stiff, etc.

Summarizing, then, the embodiment of label 7' shown in FIGS. 4–6 discloses a relatively inexpensive technique to create a touching zone 23' with a non-adhesive back of the touching zone. The fold back along the line 23c also creates a double strength touching zone 23' while neutralizing the adhesive in the area of the touching zone. The labels 7' can be cut as to provide a plurality of such labels on a sheet, printing of words as described elsewhere herein, and the sheet preferably, although not necessarily, being reusable whereby the labels can be returned to the sheet for storage after use.

Figure 7:
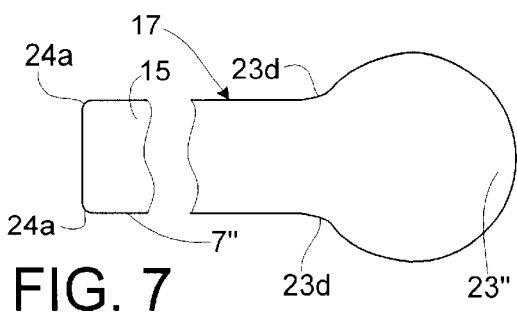
FIG. 7 is an enlarged top plan view of an exemplary label.

Briefly referring to FIG. 7, an enlarged view of a label 7" is illustrated. The label 7" is similar to the labels 7 and 7' described above, except in the label 7" the printed portion or portion intended to be printed with a word and which also has adhesive on the back, has curved corners 24a and curved transition areas 23d between the portion intended to be printed and the holding zone 23". The curvatures illustrated help to avoid damage to the label which could too easily occur at sharp corners or transitions, e.g., due to bending at the areas 24a and/or tearing at the transition areas 23d. The curves tend to increase the strength of the material in the area thereof and avoids concentration of forces that could more easily cause damage to the label compared to a label having the illustrated curves.

FIGS. 8 and 9 give the top and side views of a label holder 30, which is preferably made (cast) of plastic.

It comprises an information section 31, which, in the example, corresponds to the form of text zone 15. To the right of this, holder section 33 follows, which is circular and corresponds to the circular holding area 23 of label 7.

The information section 31 may be closed, i.e. with a closed contact area or plate 35 with circumferential edge 36, with holder section 33 which is located relatively to the right, having a circular or frame-like supporting edge 37 with circumferential boundary 39, which, opposite information section 31, is provided with a slot 43 formed by an overlap 41.

The transition area 32 from information section 31 to the holder section 33 is formed by a zigzag section, i.e. the contact area 35 in the transition area to the holder section 33 is decreasing—in our example formed by a section by pointed tongues 45. The side view according to FIG. 5 also shows that the contact area 35 in information section 31 is at a higher level as compared to the supporting edge 37 following it.

Individual labels 7 can, therefore, be removed from the foreign language learning device 1 and be affixed to such an information and label holder 30.

Due to the fact that this information and label holder 30 also has an attachment section 47 on the back, which comprises an attachment plate 49 located parallel to the information section 31, and which is connected to the base plate of the information holder via several struts 51, 8 in our example, to which, for instance, string, wires etc. can be attached for an easy attachment of the information and label holder 30 to certain objects and pieces of furniture. In the same way, the information and label holder 30 can also be provided with magnets in this attachment plate 49—or if no attachment plate 49 is provided, at the bottom of its information zone.

In order to use nails or drawing pins for attaching, for example, both in the information zone 31 and in the attachment plate 49, which is in alignment with it, there are the openings 53 and/or 55, respectively, so that a nail or a pin can be pushed through them from the top, thereby attaching the label holder to an object.

When a label is to be removed from the note-book like learning device and to be attached to an object by means of the label holder, the removed label is affixed to the information section 31 by its adhesive zone 17, with the holding area 23 resting in holder section 33. The right edge of the holding area 23 is, thereby, engaging in the above-mentioned slot 43. The brightly coloured and eye-catching holding and signal zone is, therefore, still well visible. The label holder can then or before be attached to the required object.

When the label—once the term has been memorized—is to be removed again, a finger can quite easily be stuck from below through the opening formed by the supporting edge 37 in the holder section 33 and, thereby, the holding area 23 is lifted off from holder section 33 and can easily be taken, which allows easy removal of the label with its adhesive zone from the information section 31. Lifting off is facilitated by the tongues 45 in the transition area 32 reducing the adhesive surface slowly and continuously, so that the label cannot be torn. Moreover, tearing of the label is also avoided by a continuous transition without any corners or edges from the boundary line 57 (also identified as 23d in FIG. 7) at the transition between holding area 23 to text zone 15.

Figure 10:
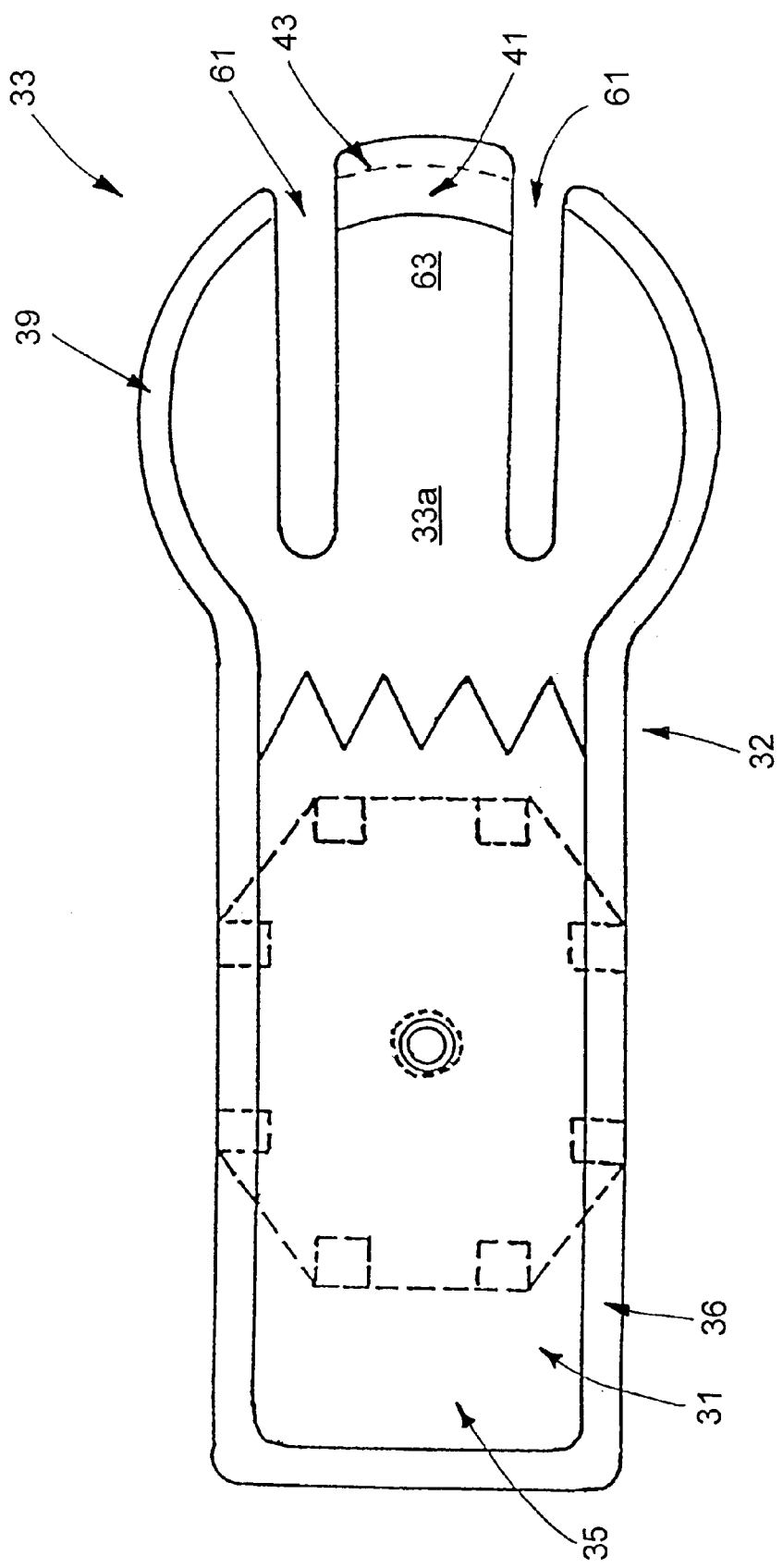
FIG. 10 is a top view of a modified application as compared to FIG. 8.

In the example according to FIG. 10, a modified form of the example as compared to FIGS. 8 and 9, holder section 33 has a more or less closed supporting surface 33a, which, in the example shown, is provided with two longitudinal openings 61, which are displaced in transverse direction, thereby, as in this example, forming a longitudinal tongue 63 between, at the end of which again a slot 43 is formed. In order to remove a label affixed there, the longitudinal tongue 63 can easily be moved up or down, so as to release the edge of the holding area 23, the label can then be taken and lifted off.

Figure 11:
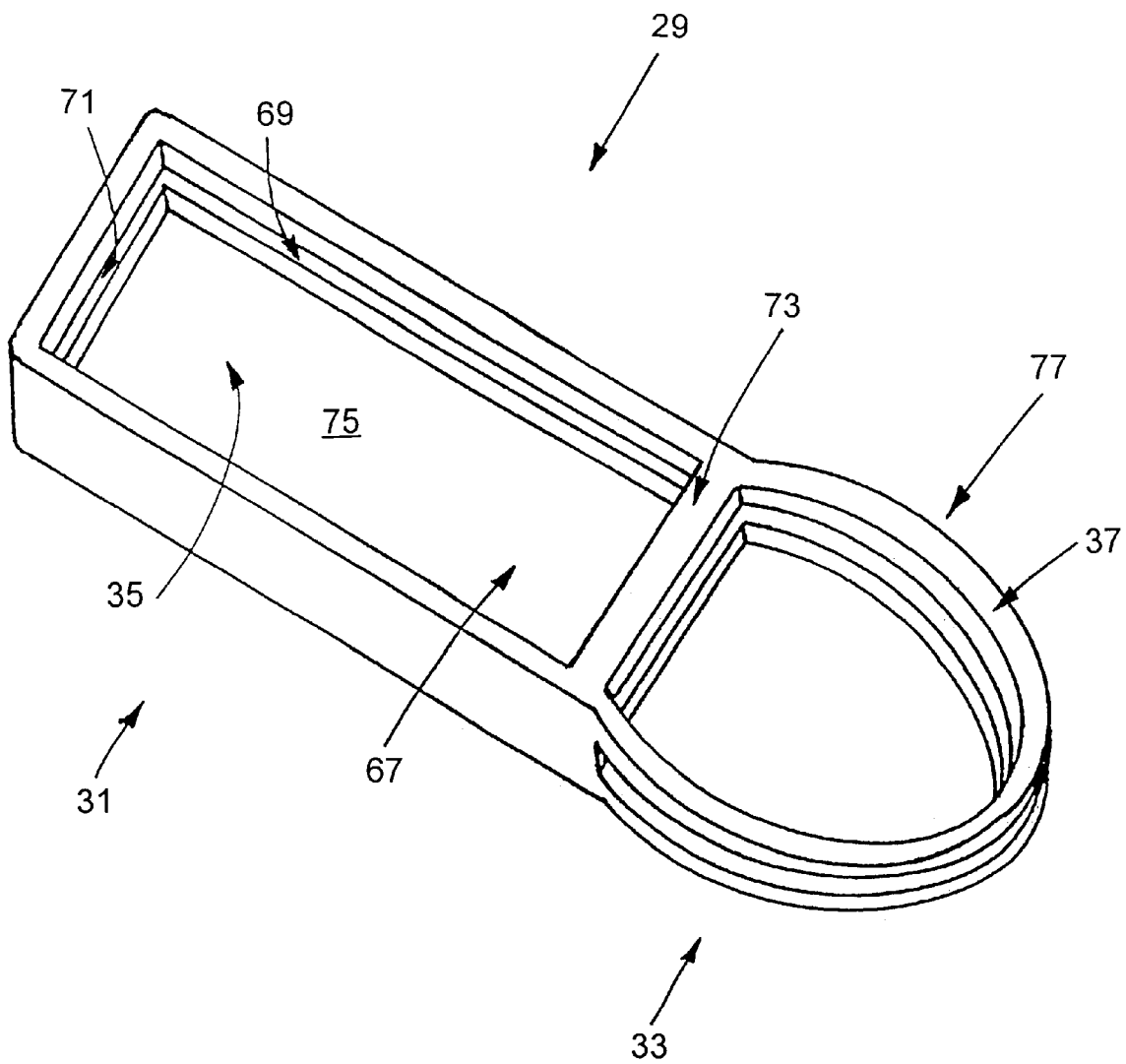
FIG. 11 is a modified application example.

FIG. 11 is a schematic drawing of an information or label holder 30, which in the area of the information section 31, is provided with a viewing section 67, which, for example, has longitudinal slots 69 at the opposite sides and a transverse slot 71 at one end. At the transition from the information to the holder section there may be a bridge-like cover 73, forming a frame-like edge and, thus, a window 75 above the bottom surface 35 in the information section 31. This information and label holder is particularly suitable for non-adhesive labels, which, one after the other, can be put into the label holder, as in the example, via a transverse slot, with the text zone 15 to be located below window 75 and the label being held via the longitudinal slots 69 and the transverse slot 71, as well as the bridge-like cover 73. In the holder section, there may also be a circular slot at the supporting edge 37, extending at least to the semi-circle diameter 77. Moreover, an additional attachment section 47 may be provided, which is similar to that described under FIGS. 4 and 5.

If such non-adhesive labels are used, they are preferably provided in a form similar to a vocabulary book, while the labels are preferably separated from each other to such an extent, that they can easily be removed from the vocabulary book via a common holding or attachment section (for example along a marked or at least perforated line) and be affixed to the object corresponding to the term, e.g. by using the above-mentioned information and label holder. The disadvantage of this method lies in the fact that the terms—once they have been memorized and are to be removed from the objects—cannot be returned to their original location on a particular page in the foreign language learning device without any extra aid.

For reasons of completeness, it must, however, be mentioned, that the individual labels can certainly be also provided independently from a vocabulary book, for example, in a sort of label box, to be taken out individually. These labels (adhesive or non-adhesive) can also be provided such that the foreign language term to be learned, is, for instance, depicted in larger print and different colour, whereas the German term, i.e. mother-tongue term, is only written in small print on the front or the back of the label. In this case, in the example according to FIG. 1, the so-called P-sheets 3 can be omitted, as only the labels themselves or the labels on the label carrier sheet 5 are used, which can be removed and returned again without separate measures or facilities being provided on which the German terms are printed in relatively the same size.

Figure 12:
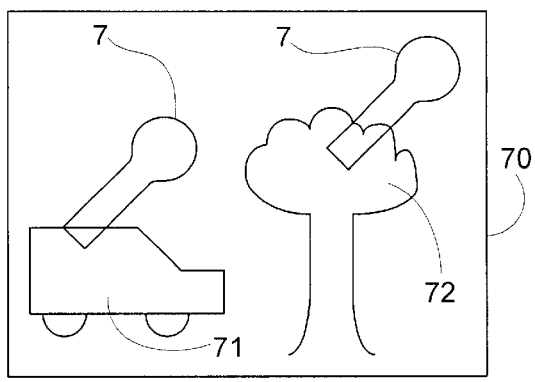
FIG. 12 is a schematic illustration of a poster with labels of the invention applied thereto.

Briefly turning to FIG. 12, a poster 70 has several objects 71, 72 printed thereon, such as, for example, an automobile and a tree, respectively. The poster may be placed in a room where there is not otherwise available images of an automobile or tree or where such objects can be seen only through a window, for example. Labels 7 according to the invention having the corresponding word for automobile or tree may be applied to the poster so the user has the opportunity to apply the invention to images of objects, especially objects which are relatively remote from the poster.

Figure 13:
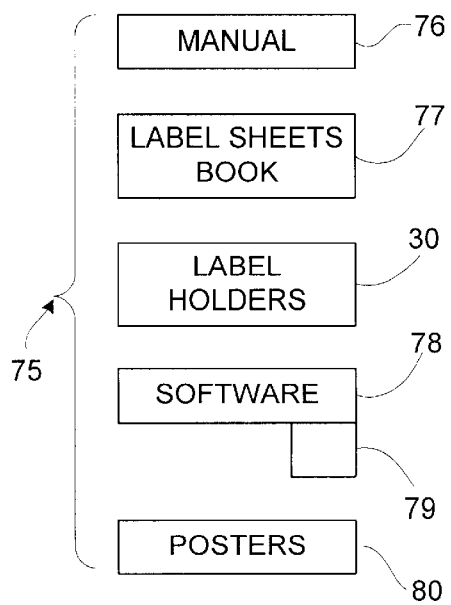
FIG. 13 is a schematic view of a kit in accordance with the invention.

A kit 75 embodying the invention is represented in FIG. 13. The kit includes several components, for example, an instruction manual 76 for practicing the invention and a supply 77 of labels 7. The instruction manual describes the use of the labels and the method of practicing the invention. Thus, for example, the method includes using multiple senses to help memorize words of a language and to help learn the meaning of those words. The supply of labels may include individual sheets on which one or more labels are located; the labels may be pre-printed with words or one, more or all of the labels may be empty and available to have words written, printed, etc. thereon. Some pages may have printed labels and other pages may have unprinted labels. The labels may be on sheets fastened in a book or held in a loose-leaf notebook or some other retention mechanism that facilitates organization and maintaining of the labels. If desired, the labels may be organized or grouped by subject matter, e.g., household items, furniture, appliances, garden equipment, food products, etc.

According to a method of the invention, a label 7 with a word or phrase is selected and is applied to an object. For example, the object may be a chair. The person may say the word or phrase for chair as printed on the label, may sit in the chair, may feel the chair, may rub a hand on the chair, and may see the label and repeat the word each time encountering the particular chair. Thus, the view, sound, and feel of the chair can be associated with the word representing chair. Similarly for a flower or plant, the label on which the word "flower" is printed may be applied to a leaf, to a flower pot, or to one of the label holders and that attached by a string to the plant; and the person learning the language may not only say the word and, thus, hear it, but also may feel the flower, see the flower and smell the flower.

The kit 75 also may include a supply of the mentioned label holders and string, pins, magnets, etc. to attach the label holders to an object. Further, the kit may include posters 70.

As is described further below, the invention includes computer software 78 to print labels for use according to the above described methods. Therefore, if desired, the kit 75 may include a computer readable medium 79 or other readable medium on which the software may be stored, such as a magnetic disk, optical disk, tape, or some other medium on which the program may be stored for use by a reader and associated electronic equipment, such as a computer, for printing or otherwise generating labels.

Figure 14:
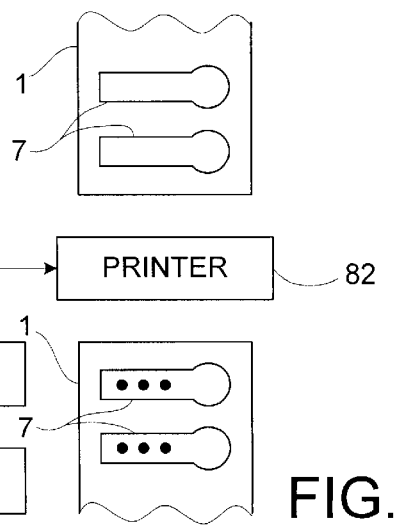
FIG. 14 is a schematic block diagram of a computer system for making labels.

Referring, now, to FIG. 14, a system 80 for making labels 7 is illustrated in block form. The system includes a computer 81 or similar device which can be operated to control a printer 82 to print labels 7. The printer 82 may be any of many types of printers, several examples including a laser printer, dot matrix printer, ink jet printer, bubble printer, or virtually any other printer. Sheets 1 of labels 7 may be fed to the printer. The printer may print the first language word, the foreign language word, a number organizer, and/or other information on the sheet 1, on the labels 7, etc. An exemplary computer 81 is that known as a personal computer, such as a K-6 microprocessor or Pentium microprocessor based computer; or the computer may be virtually any other computer, as may be desired. A keyboard 83 and monitor 84 are coupled to the computer 81 to provide manual input to the computer and to display information from the computer; exemplary information being settings and operation of the computer program, the words and/or other information to be printed, etc. A storage device 85, such as a program reader and/or storage mechanism, examples being a floppy disk drive, fixed disk, cd-rom drive, tape drive, etc., and a storage medium 86, such as a magnetic disk, optical disk, tape or other medium on which a computer program is stored, are coupled to the computer to provide computer program control of the computer and/or printer and/or to store information otherwise input to the computer, as is conventional in computer systems. A computer program 90 associated with the system 80 is illustrated schematically in flow chart form in FIG. 15.

In using the system 80, one or more sheets 1 containing labels 7 are provided the printer. The computer program 90 is provided the computer 81 to control operation thereof. Using the system 80 and program 90, and, if necessary, with inputs provided by the user employing the keyboard 83, the system 80 operates the printer 82 to print information on the sheets 1 and, in particular, on the labels 7. Such information may be as was described above. For example, the printer 82 may print on a label 7 a particular language word intended to be learned or memorized as well as some other reference to that word, e.g., elsewhere on the sheet 1, say adjacent the mentioned label. The printer also may print coordinating indicia to facilitate replacing labels on the sheets 1. The mentioned reference to the subject word may be the word in the usual language of the person who would be using the program. Alternatively, or additionally, if desired the reference may be a picture; for example, if the word printed on a give label were the word "tree", the image of a tree may be printed on the sheet 1. This would facilitate using images to coordinate placing labels on objects and also would help the user further to associate the image of a tree with the word for "tree" without even having to think about the word as used in the usual language or origin language of the user.

Figure 15:
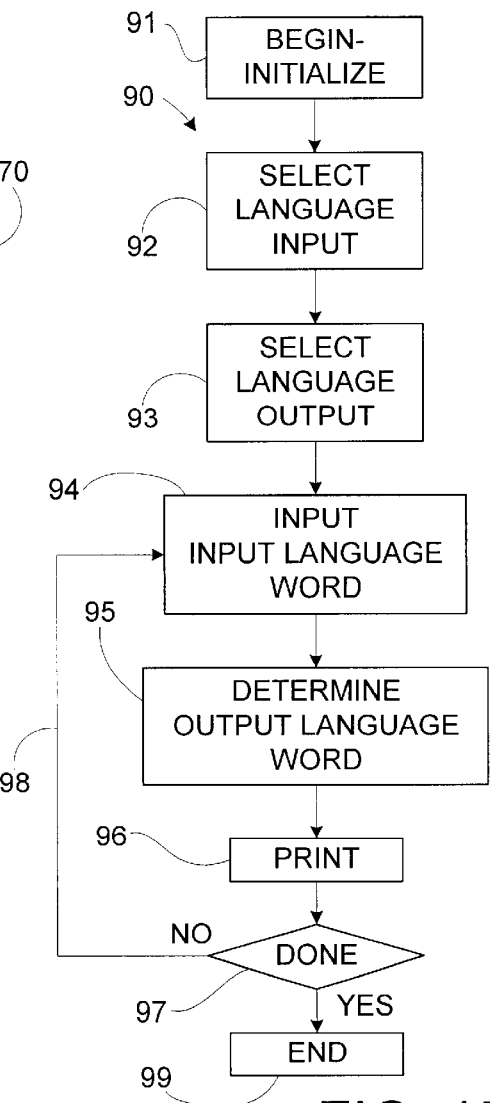
FIG. 15 is a flow chart of a computer program for making labels.

Turning to FIG. 15, a computer program for practicing the invention to make labels is illustrated at 90. The program 90 is presented in flow chart form; it will be appreciated that appropriate computer program source code, machine language, or some other machine useable implementation of the flow chart may be written by a person who has ordinary skill in the computer programming art so as to allow the system 80, for example, to carry out the program and the invention. The actual computer program language used may depend on the particular computer 81 used in the system 80.

In the program 90 illustrated in FIG. 15, at step 91 the program (and system 80) is initialized. At step 92 an input language is selected; for example, if the user's ordinary language were English, then the selected language would be English—similarly for French, German, Japanese or some other language. At step 93 the output language is selected; this is the language to be learned. At step 94, a word is input to the computer 81, e.g, using the keyboard 83; and at step 95 the computer determines the output word to be printed onto a label by the printer 82. Thus, for example, if the input language were German and the output language were German, then the word "Stuhl" could be the input word, and the computer would select "chair" as the output word. The storage medium 86 may include a dictionary of terms in the respective languages to allow selecting the corresponding words in the input and output languages. Commercial computer based dictionaries currently are available and may be used for this purpose. The system 80 then causes printing at block 96 of both those words on the label and on the paper 1 adjacent the corresponding label 7, or may print the output word (on the label) and a reference, such as a picture of a chair, proximate the label on the page 1. At block 97 an inquiry is made whether the user is finished printing labels; if not then a loop line 98 is followed to block 94. If the user has finished using the program 90, then the program ends at block 99. The labels then can be used according to the method of the invention as described above and equivalents thereof.

It will be appreciated that the labels 7 can be pre-printed or formed on the sheets 1, for example. Alternatively or additionally, some or all of the labels 7 can be printed by the user, for example, using the system 80 and program 90.

In using the invention a language can be learned and/or words associated with that language can be memorized. The words or phrases may be of the object itself, e.g., the word "tree", or the words may concern a characteristic of the object, such as sweet smell of a tree, hardness of a steel beam, etc., or an abstract idea, such as happiness of an individual. The invention allows use of multiple senses as inputs to the brain in association with a word or object represented by the word, thus increasing the likelihood of remembering the word in issue.

It will be appreciated that although the invention is described with respect to several features and embodiments, the scope of the invention is to be limited only by the scope of the claims and equivalents thereof.

I claim:

1. Foreign language learning device in the form of a book, such as a vocabulary book or note-book, containing foreign language terms to be learned, characterized by
    a reproduction or depiction holder which has a plurality of labels and an information holder connected thereto,
    wherein the labels are each provided with an adhesive zone,
    wherein the information holder is provided with a holder section and means for removably attaching the information holder to an object, and
    wherein the labels have individual of the foreign language terms, groups of the terms, sentences or sentence parts to be learned printed on them.

2. Foreign language learning device according to claim 1, characterized by the labels extending at least partially beyond a label holder holding them.

3. Foreign language learning device according to claim 1, characterized by the labels being located on a label carrier sheet, being self-adhesive labels and having no adhesive film on a back side.

4. Foreign language learning device according to claim 1, characterized by the holding area of each of the labels being different in size than the text zone of the label.

5. Foreign language learning device according to claim 4, characterized by the holding area being optically different from the text zone.

6. Foreign language learning device according to claim 1, characterized by the information holder being operatively configured to receive one or more of the labels, the labels being operatively configured to be separably attached to the information holder.

7. Foreign language learning device according to claim 6, characterized by the information holder being made of plastic.

8. Foreign language learning device according to claim 6, characterized by the information holder being divided into an information section and the holder section, with the information section being similar in form and size to a text zone of the labels which has the individual of the foreign language terms, groups of the terms, sentences or sentence parts to be learned printed thereon.

9. Foreign language learning device according to claim 6, characterized by the holder section of the information holder being similar in size and shape to holding areas of the labels.

10. Foreign language learning device according to claim 6, characterized by an information section of the information holder being provided with a contact area, and the holder section being at least partially open at its bottom.

11. Foreign language learning device according to claim 6, characterized by slots being provided at least in parts of the circumference of the holder section, the slots being operatively configured to overlap partially with an edge of the label to be affixed to the information holder.

12. Foreign language learning device according to claim 6, characterized by a raised surface of an information section of the information holder, at the transition section from the information section to the holder section, being raised as compared to a supporting edge of the holder section, wherein the raised surface triangular pointed sections forming a sawtooth-shaped edge.

13. Foreign language learning device according to claim 6, characterized by the information holder including an attachment section on a back side.

14. Foreign language learning device according to claim 13, characterized by the attachment section being an attachment plate running in parallel with an information section.

15. Foreign language learning device according to claim 14, characterized by the attachment plate being connected to a base plate of the information holder via several struts.

16. Foreign language learning device according to claim 15, characterized by the attachment plate being provided with corresponding openings on opposite sides thereof.

17. Foreign language learning device according to claim 1, characterized by the adhesive zone and the text zone being on opposite respective sides of the label.

18. Foreign language learning device according to claim 1, characterized by the adhesive zone being substantially similar in size and location to the text zone.

19. Foreign language learning device according to claim 1, characterized by the labels being attached or stuck to a label carrier sheet by means of the adhesive zones.

20. Foreign language learning device according to claim 19, characterized by multiple label carrier sheets being bound in a book or note-book.

21. Foreign language learning device according to claim 1, characterized by a section of the labels extending beyond a label carrier sheet, the section being without adhesive film on either side.

22. Foreign language learning device according to claim 1, characterized by a section of the labels extending beyond a label carrier sheet, or a section of the label carrier sheet, wherein at least the section is provided with an adhesive film on a back side, being covered with a separate cover.

23. Foreign language learning device according to claim 1, characterized by the labels being located on a label carrier sheet, the labels being self-adhesive labels an adhesive film on a reverse side which is covered by a removable film.

24. Foreign language learning device according to claim 1, characterized by the holding area of each of the labels being different in shape than the text zone of the label.

25. Foreign language learning device according to claim 24, characterized by the holding area being optically different from the text zone.

26. Foreign language learning device in the form of a book, such as a vocabulary book or a notebook, containing foreign language terms to be learned, characterized by
    multiple label carrier sheets being bound in a book or note-book, each of the label carrier sheets having multiple labels thereupon, wherein each of the labels includes an adhesive zone, and wherein the labels have individual of the foreign language terms; and
    respective printed sheets inserted adjacent each of the label carrier sheets, wherein the printed sheets have mother-tongue terms printed on them, which correspond to the foreign-language terms printed on the labels wherein the printed sheets with the mother-tongue terms on them are larger in size than the label carrier sheets, so that the labels with the foreign language terms are laterally displaced with reference to the mother-tongue terms written on the printed sheets.

27. Foreign language learning device in the form of a book, such as a vocabulary book or note-book, containing foreign language terms to be learned, characterized by an information holder and a plurality of non-adhesive labels;

the labels having individual of the foreign language terms, groups of the terms, sentences or sentence parts to be learned printed on them;

the information holder being provided with a holder section and an information section; and the information section being provided with slots at multiple of its sides, the slots operatively configured to allow the non-adhesive labels to be inserted and held therein.

28. Foreign language learning device according to claim 27, characterized by the information holder being provided with a window in communication with the slots.

29. Foreign language learning device according to claim 27, characterized by the information holder being provided with bridge-like covers for receiving the label.

* * * * *